(12) United States Patent
Hao et al.

(10) Patent No.: US 10,009,891 B2
(45) Date of Patent: Jun. 26, 2018

(54) COMMUNICATION METHOD, SERVER AND TERMINAL

(71) Applicant: LENOVO (BEIJING) LIMITED, Beijing (CN)

(72) Inventors: Zhuangzhuang Hao, Beijing (CN); Xuegong Zhou, Beijing (CN)

(73) Assignee: LENOVO (BEIJING) LIMITED (CN)

( * ) Notice: Subject to any disclaimer, the term of this patent is extended or adjusted under 35 U.S.C. 154(b) by 0 days. days.

(21) Appl. No.: 15/085,021

(22) Filed: Mar. 30, 2016

(65) Prior Publication Data

US 2017/0181147 A1 Jun. 22, 2017

(30) Foreign Application Priority Data

Dec. 21, 2015 (CN) .......................... 2015 1 0963349

(51) Int. Cl.
*H04W 72/04* (2009.01)
*H04W 12/06* (2009.01)
(Continued)

(52) U.S. Cl.
CPC ........... *H04W 72/044* (2013.01); *H04W 8/26* (2013.01); *H04W 12/06* (2013.01); *H04W 60/00* (2013.01);
(Continued)

(58) Field of Classification Search
CPC ..... H04W 12/06; H04W 12/08; H04W 76/02; H04W 76/021; H04W 12/04; H04W 8/02;
(Continued)

(56) References Cited

U.S. PATENT DOCUMENTS

2004/0152446 A1* 8/2004 Saunders .......... H04L 29/12009
455/411
2006/0148483 A1* 7/2006 Howard ............. H04B 7/18539
455/450
(Continued)

FOREIGN PATENT DOCUMENTS

CN 101563943 A 10/2009
CN 103916844 A 7/2014
(Continued)

OTHER PUBLICATIONS

1st Chinese Office Action dated May 4, 2018 re Application of Lenovo (Beijing) Co., Ltd., No. 201510963349.X—Summary of action in English.

*Primary Examiner* — Nizar Sivji
(74) *Attorney, Agent, or Firm* — Patrick J. Daugherty; Driggs, Hogg, Daugherty & Del Zoppo Co., LPA

(57) ABSTRACT

This invention discloses a communication methods, servers, and terminals. Aspects receive an allocation request, used for registering and connecting to the communication network, of an identity identifier from a terminal; parse the allocation request of the identity identifier and acquiring an attribute information of the identity identifier; find, from a plurality of identity identifier candidates, an identity identifier matching with the attribute information of the identity identifier and regard the found identity identifier as the one to be allocated; read the data, used for registering and connecting to the communication network, of the to-be-allocated identity identifier, and send the data, used for registering and connecting to the communication network, of the to-be-allocated identity identifier to terminals.

10 Claims, 8 Drawing Sheets

(51) Int. Cl.
  *H04W 60/00* (2009.01)
  *H04W 8/26* (2009.01)
  *H04W 76/11* (2018.01)
  *H04L 29/06* (2006.01)
(52) U.S. Cl.
  CPC ......... *H04W 76/11* (2018.02); *H04L 63/0876* (2013.01)
(58) Field of Classification Search
  CPC ... H04W 48/08; H04W 76/025; H04W 28/02; H04W 60/00; H04W 60/02; H04L 63/083; H04L 65/1073; H04L 67/10; H04L 63/10; H04L 63/105; G06F 21/31; G06F 2221/2117; H04M 2203/6081
  See application file for complete search history.

(56) References Cited

U.S. PATENT DOCUMENTS

2013/0065557 A1   3/2013   Zhang et al.
2014/0310341 A1*  10/2014  Watanabe ............... H04L 63/08
                                                  709/203

FOREIGN PATENT DOCUMENTS

CN    104717598 A    6/2015
EP      2661129 A1   6/2013

* cited by examiner

COMMUNICATION METHOD, SERVER AND TERMINAL

TECHNICAL FIELD

The present invention relates to communication technology, more particularly, to a communication method, a server and a terminal.

BACKGROUND

With the development of the smart terminals and the development of wireless network technology, users expect to use the same terminal to access to the Internet at different locations. Different locations may be covered with different communication network; accordingly, terminal users may need to pay expensive roaming data service expenses for data transmission, especially in the case of international roaming.

To save expenses, the service expenses generated in international roaming shall be local. For this purpose, roaming business suppliers sign the agreement with the service providers in advance, to get the card information of the roaming countries, write the card information required by a plurality of roaming countries on the terminal in advance, And use the prewritten card information of the corresponding roaming countries directly to complete the business data localization when the terminal is roaming. However, for the card provided with mobile phone key identifier (Ki, Key identifier) is directly needed to get on the Internet, so the roaming business suppliers must sign an agreement with the global service providers and obtain the card information, but, actually, many service providers do not provide this service. Therefore, the supporting number of roaming countries is obviously limited. And, prefabricating a plurality of card resources causes a waste in the number of segment resources. Hence, it is expected that a method can conveniently provide service providers data transmission services in roaming countries to save roaming data service expenses.

SUMMARY OF THE INVENTION

Aspects of the present invention include a computer-implemented method of executing on a computer processor steps that include:

in response to receiving an allocation request that comprises an identity identifier for registering and connecting to a communication network from a terminal, parsing the allocation request and thereby acquiring an attribute information of the identity identifier;

finding, from a plurality of identity identifier candidates, an identity identifier matching the acquired attribute information of the identity identifier;

regarding the found identity identifier as one to be allocated;

reading data for registering and connecting to the communication network from the found to-be-allocated identity identifier; and sending the read data of the found to-be-allocated identity identifier to the terminal for use for registering and connecting to the communication network.

Another aspect of the present invention includes a server comprising a processor that is in communication with a memory and a communication network terminal. The processor defines an arbitration module that, in response to a received allocation request of an identity identifier, parses the allocation request of the identity identifier and thereby acquires an attribute information of the identity identifier, and finds, from a plurality of identity identifiers, an identity identifier matching with the attribute information of the identity identifier and regards the found identity identifier as one to be allocated.

Another aspect of the present invention includes a terminal comprising an input device that receives an as input a target parameter, and a processor in communication with the input device. The terminal processor generates an allocation request for registering and connecting to a communication network for an identity identifier based on the target parameter; sends the allocation request of the identity identifier to a server for use in enabling the server to parse the request and acquiring an attribute information of the identity identifier and determining the to-be-allocated identity identifier based on an attribute information of the identity identifier; receives data of the to-be-allocated identity identifier sent by the server; and uses the data received from the server for registering and connecting to a communication network.

BRIEF INTRODUCTION OF DRAWINGS

DETAILED DESCRIPTION OF THE INVENTION

To understand the characteristics and technical content of the embodiments of the present invention in greater detail, the implementation is described below in detail with reference to the accompanying drawings in the embodiments of the present invention. The accompanying drawings are only for reference, not for limiting the embodiments of the present invention.

Figure 1:
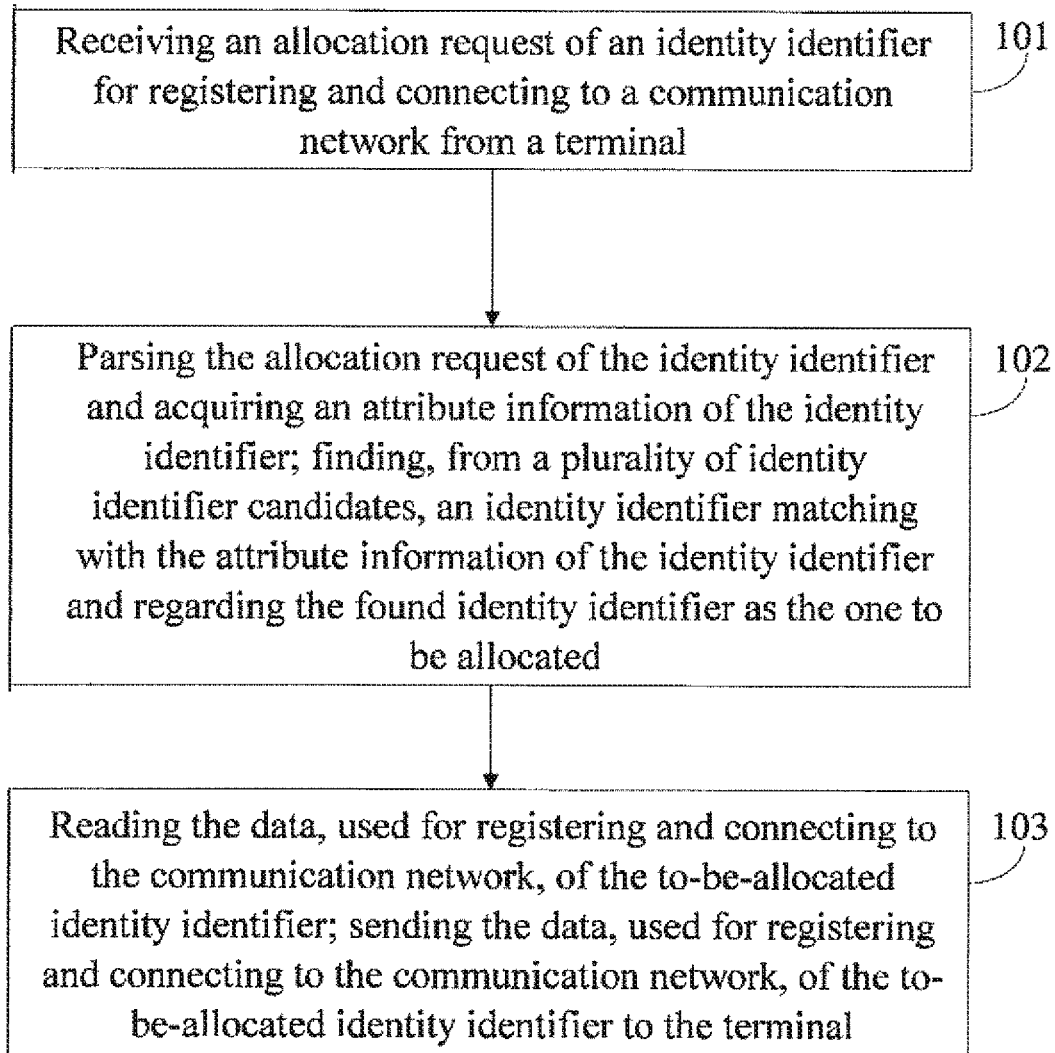
FIG. 1 is a flow diagram of a communication method according to embodiment 1 of the present invention.

FIG. 1 is a flow diagram of a communication method according to embodiment 1 of the present invention; the communication method, in the present example, applies to the server side; the communication method comprises the following steps, as shown in FIG. 1.

Step 101: receiving an allocation request of an identity identifier for registering and connecting to a communication network from a terminal.

In the embodiments of the present invention, the identity identifier is the only identifier for the terminal connecting to the communication network; the embodiments of the present invention are illustrated by the example using the identity identifier as the communication card.

In the embodiments of the present invention, the terminal comprises a communication module 1 and a communication module 2, the communication module 1 is implemented by a modem 1, and the communication module 2 is implemented by a modem 2. The terminal is provided with a card slot, a communication card can be inserted in the card slot, and the communication card is called the user identifier module for users according to the embodiments of the present invention. Wherein, the communication card is an entity card, the communication card can be any type, such as a SIM card, UIM card, etc. The terminal can be provided with two or more card slots, with two or more built-in communication cards respectively.

In the embodiments of the present invention, the first identity identifier is a user identifier module having a data roaming function. The embodiments of the present invention are illustrated by the example using the user identifier module as the SIM card, wherein having a data roaming function means the terminal can implement the data communication for roaming areas directly via the first identity identifier when the terminal is in the roaming areas; however, it requires the use of Ki information for encryption and decryption of data during data communication, and the home service provider for the first identity identifier needs to sign an agreement with the roaming service provider; and roaming charges are higher. For this purpose, the embodiments of the present invention process the data roaming service by using the virtual second identity identifier instead of the first identity identifier. Certainly, the first identity identifier can further process the normal data communication when the second identity identifier processes the data roaming service. To process the data roaming service by using the second identity identifier, the data (also called card information of the second identity identifier) for registering and connecting to the communication network of the second identity identifier needs to be obtained; therefore, the terminal sends the allocation request of the identity identifier to the server to obtain the data for registering and connecting to the communication network of the second identity identifier. Specifically, the first data connection for the first identity identifier should be established on the communication module 2; and the first data connection is to be called Data 1 according to the embodiments of the present invention.

Specifically, the first identity identifier stores key information of the first identity identifier, such as phone numbers, text messages, SIM card password, SIM card number, Ki information, etc. The first identity identifier establishes the Data 1 by using this key information after connecting to the communication module 2.

Thus, the communication module in the server receives the allocation request of the identity identifier from the terminal via the established Data 1. Specifically, the server receives the allocation request of the identity identifier sent by the communication module 2 in the terminal.

Step 102: parsing the allocation request of the identity identifier and acquiring attribute information of the identity identifier; finding, from a plurality of identity identifier candidates, an identity identifier matching with the attribute information of the identity identifier and regarding the found identity identifier as the one to be allocated.

Wherein, the allocation request of the identity identifier carries a wealth of information of the terminal (attribute information of the identity identifier), such as the device identification information of the terminal, network information belonging to the service providers of the terminal (location information), the network type information of the terminal, etc.

For example, network information for the service providers can be Mobile or Telecom or Unicom. Network type information of the terminal can be GSM (Global System for Mobile Communication) network, CDMA (Code Division Multiple Access) network, WCDMA (Wideband Code Division Multiple Access) network, LTE (Long Term Evolution) communication network, etc.

In the embodiments of the present invention, the server is provided with a collection of identity identifiers (a card pool); the collection of identity identifiers is provided with more than one component, and the components support the insertion of a plurality of identity identifiers; each component in the collection of identity identifiers and the identity identifier on each component is addressed in accordance with the default rule. To manage conveniently, inserting the identity identifier for the network information of the same service provider in the adjacent position, and setting up the corresponding address for these identity identifiers. Or, inserting the identity identifier for the same network type information in the adjacent position, and setting up the corresponding address for these identity identifiers. Afterwards, the arbitration module in the server finds, from a plurality of identity identifiers in the identity identifier collection, an identity identifier corresponding to the allocation request of the identity identifier and regards the found identity identifier as the to-be-allocated identity identifier based on the network information for the service providers of the terminal and the network type information of the terminal.

In the embodiments of the present invention, parsing the allocation request of the identity identifier and acquiring the device identification information of the terminal, and/or the local information of the terminal and/or the network type information of the terminal; determining the to-be-allocated identity identifier based on the device identification information of the terminal, and/or the local information of the terminal, and/or the network type information of the terminal; find, from a plurality of identity identifier candidates, the to-be-allocated identity identifier.

Step 103: reading the data, used for registering and connecting to the communication network, of the to-be-allocated identity identifier; sending the data, used for registering and connecting to the communication network, of the to-be-allocated identity identifier to the terminal.

In the embodiments of the present invention, the collection of identity identifiers for the server stores a plurality of data for each country and each region used to register and connect to the communication network, and the information comprises other key information, except for Ki information. The terminal sends the allocation request of the identity identifier for the second identity identifier to the communication module by using the Data 1, after establishing the Data 1; the arbitration module finds out the data of the second identity identifier for registering and connecting to the communication network of the country and region that the terminal is in. Afterwards, the communication module sends the data of the second identity identifier for registering and connecting to the communication network to the terminal. Because the second identity identifier is established based on the data for registering and connecting to the communication network of the server side, instead of the real existing entity card, therefore, the second identity identifier is the virtual user identifier module.

In the embodiments of the present invention, the actual need of the data when establishing the data connection is the data for registering and connecting to the communication network; the first identity identifier, in the form of an entity card, uses the data for registering and connecting to the communication network to establish the Data 1 on the communication module 2; and the second identity identifier, in the form of a virtual card, uses the data for registering and connecting to the communication network to establish the second data connection on the communication module 1; the second data connection is called Data 2 according to the embodiments of the present invention.

In the embodiments of the present invention, when the established Data 2 is in the data roaming service, the Ki information is not used, because the virtual second identity identifier is used, and service providers of the first identity identifier do not need to sign an agreement with the service providers of each country and each region. It is thus clear that the supported countries and regions of the technical solutions in the embodiments of the present invention are unrestricted, and the expenses of the data roaming service can be localized, saving user's capital expenditures.

Figure 2:
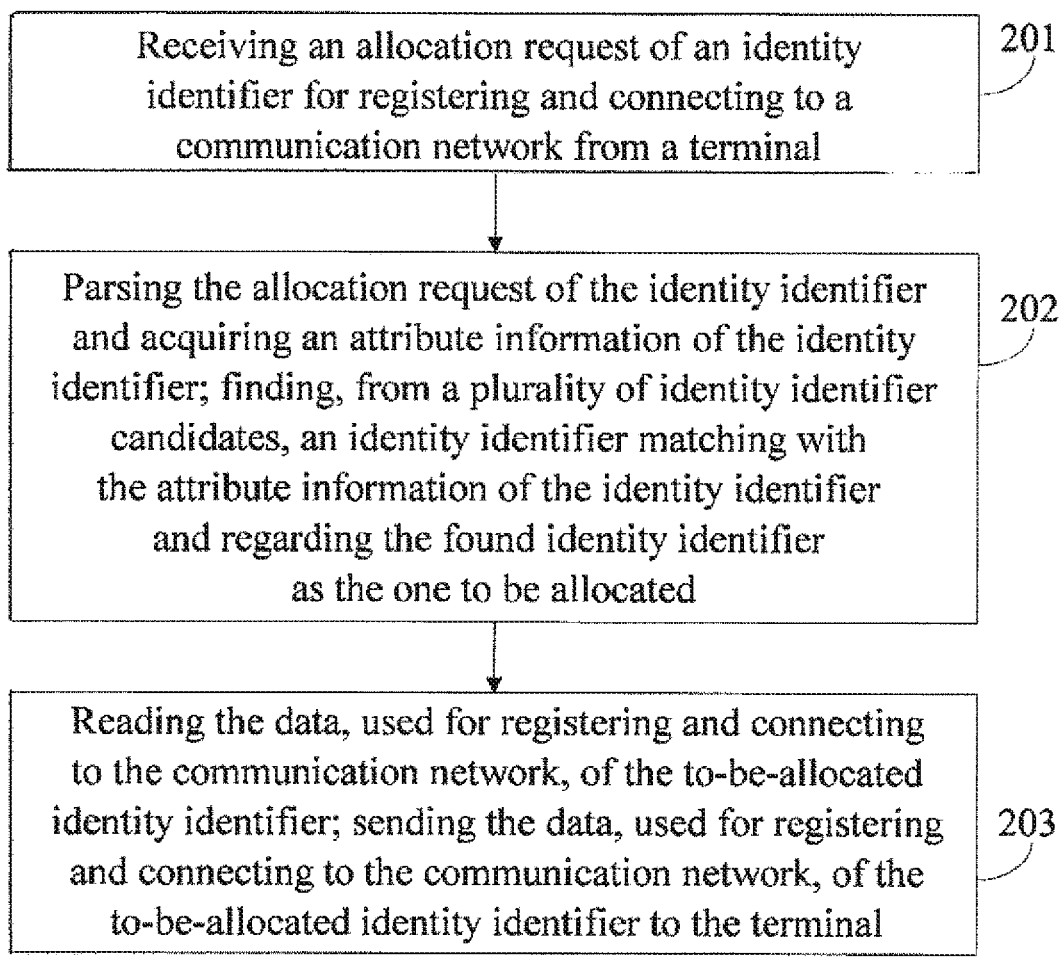
FIG. 2 is a flow diagram of a communication method according to embodiment 2 of the present invention.

FIG. 2 is a flow diagram of a communication method according to embodiment 2 of the present invention; the communication method, in the present example, applies to the server side; the communication method comprises the following steps, as shown in FIG. 2.

Step 201: receiving an allocation request of an identity identifier for registering and connecting to a communication network from a terminal.

In the embodiments of the present invention, the identity identifier is the only identifier for the terminal connecting to the communication network; the embodiments of the present invention are illustrated by the example using the identity identifier as the communication card.

In the embodiments of the present invention, the terminal comprises a communication module 1 and a communication module 2, the communication module 1 is implemented by a modem 1, and the communication module 2 is implemented by a modem 2. The terminal is provided with a card slot, a communication card can be inserted in the card slot, and the communication card is called the user identifier module for users according to the embodiments of the present invention. Wherein, the communication card is an entity card, the communication card can be any type, such as a SIM card, UIM card, etc. The terminal can be provided with two or more card slots, with two or more built-in communication cards respectively.

In the embodiments of the present invention, the first identity identifier is a user identifier module having a data roaming function. The embodiments of the present invention are illustrated by the example using the user identifier module as the SIM card, wherein having a data roaming function means the terminal can implement the data communication for roaming areas directly via the first identity identifier when the terminal is in the roaming areas; however, it requires the use of Ki information for encryption and decryption of data during data communication, and the home service provider for the first identity identifier needs to sign an agreement with the roaming service provider; and roaming charges are higher. For this purpose, the embodiments of the present invention process the data roaming service by using the virtual second identity identifier instead of the first identity identifier. Certainly, the first identity identifier can further process the normal data communication when the second identity identifier processes the data roaming service. To process the data roaming service by using the second identity identifier, the data (also called card information of the second identity identifier) for registering and connecting to the communication network of the second identity identifier needs to be obtained; therefore, the terminal sends the allocation request of the identity identifier to the server to obtain the data for registering and connecting to the communication network of the second identity identifier. Specifically, the first data connection for the first identity identifier should be established on the communication module 2; and the first data connection is to be called Data 1 according to the embodiments of the present invention.

Specifically, the first identity identifier stores key information of the first identity identifier, such as phone numbers, text messages, SIM card password, SIM card number, Ki information, etc. The first identity identifier establishes the Data 1 by using this key information after connecting to the communication module 2.

Thus, the communication module in the server receives the allocation request of the identity identifier from the terminal via the established Data 1. Specifically, the server receives the allocation request of the identity identifier sent by the communication module 2 in the terminal.

Step 202: parsing the allocation request of the identity identifier and acquiring attribute information of the identity identifier; finding, from a plurality of identity identifier candidates, an identity identifier matching with the attribute information of the identity identifier and regarding the found identity identifier as the one to be allocated.

Wherein, the allocation request of the identity identifier carries a wealth of information of the terminal, such as the device identification information of the terminal, network information belonging to the service providers of the terminal (location information), the network type information of the terminal, etc.

For example, network information for the service providers can be Mobile or Telecom or Unicom. Network type information of the terminal can be GSM network, CDMA network, WCDMA network, LTE communication network, etc.

In the embodiment of the present invention, the server is provided with a collection of identity identifiers (a card pool); the collection of identity identifiers is provided with more than one component, and the components support the insertion of a plurality of identity identifiers; each component in the collection of identity identifiers and the identity identifier on each component is addressed in accordance with the default rule. To manage conveniently, inserting the identity identifier for the network information of the same service provider in the adjacent position, and setting up the corresponding address for these identity identifiers. Or, inserting the identity identifier for the same network type information in the adjacent position, and setting up the corresponding address for these identity identifiers. Afterwards, the arbitration module in the server finds, from a plurality of identity identifiers in the identity identifier collection, an identity identifier corresponding to the allocation request of the identity identifier and regards the found identity identifier as the to-be-allocated identity identifier based on the network information for the service providers of the terminal and the network type information of the terminal.

In an implementation of the present invention, the terminal determines the to-be-allocated identity identifier after acquiring the device identification information of the terminal, and/or the roaming destination information, and/or the network type information of the terminal; sends the allocation request of the identity identifier carried within the to-be-allocated identity identifier; and the server parses the allocation request of the identity identifier and acquires the to-be-allocated identity identifier; finds, from a plurality of identity identifier candidates, the to-be-allocated identity identifier.

Step 203: acquiring address information of the to-be-allocated identity identifier; reading the data, used for registering and connecting to the communication network, of the to-be-allocated identity identifier; sending the data, used for registering and connecting to the communication network, of the to-be-allocated identity identifier to the terminal.

In the embodiments of the present invention, the collection of identity identifiers for the server stores a plurality of data for each country and each region used to register and connect to the communication network, and the information comprises other key information, except for Ki information. The terminal sends the allocation request of the identity identifier for the second identity identifier to the communication module by using the Data 1 after establishing the Data 1; the arbitration module finds the data of the second identity identifier for registering and connecting to the communication network of the country and region that the terminal is in. Afterwards, the communication module sends the data of the second identity identifier for registering and connecting to the communication network to the terminal. Because the second identity identifier is established based on the data for registering and connecting to the communication network of the server side, and is not a physical entity card, therefore, the second identity identifier is a virtual user identifier module.

In the embodiments of the present invention, the actual need of the data when establishing the data connection is the data for registering and connecting to the communication network; the first identity identifier, in the form of an entity card, uses the data for registering and connecting to the communication network to establish the Data 1 on the communication module 2; and the second identity identifier, in the form of a virtual card, uses the data for registering and connecting to the communication network to establish the second data connection on the communication module 1; the second data connection is called Data 2 according to the embodiments of the present invention.

In the embodiments of the present invention, when the established Data 2 is in the data roaming service, the Ki information is not used, because the virtual second identity identifier is used, and service providers of the first identity identifier do not need to sign an agreement with the service providers of each country and each region. It is thus clear that the supported countries and regions of the technical solutions in the embodiments of the present invention are unrestricted, and the expenses of the data roaming service can be localized, saving user's capital expenditures.

Figure 3:
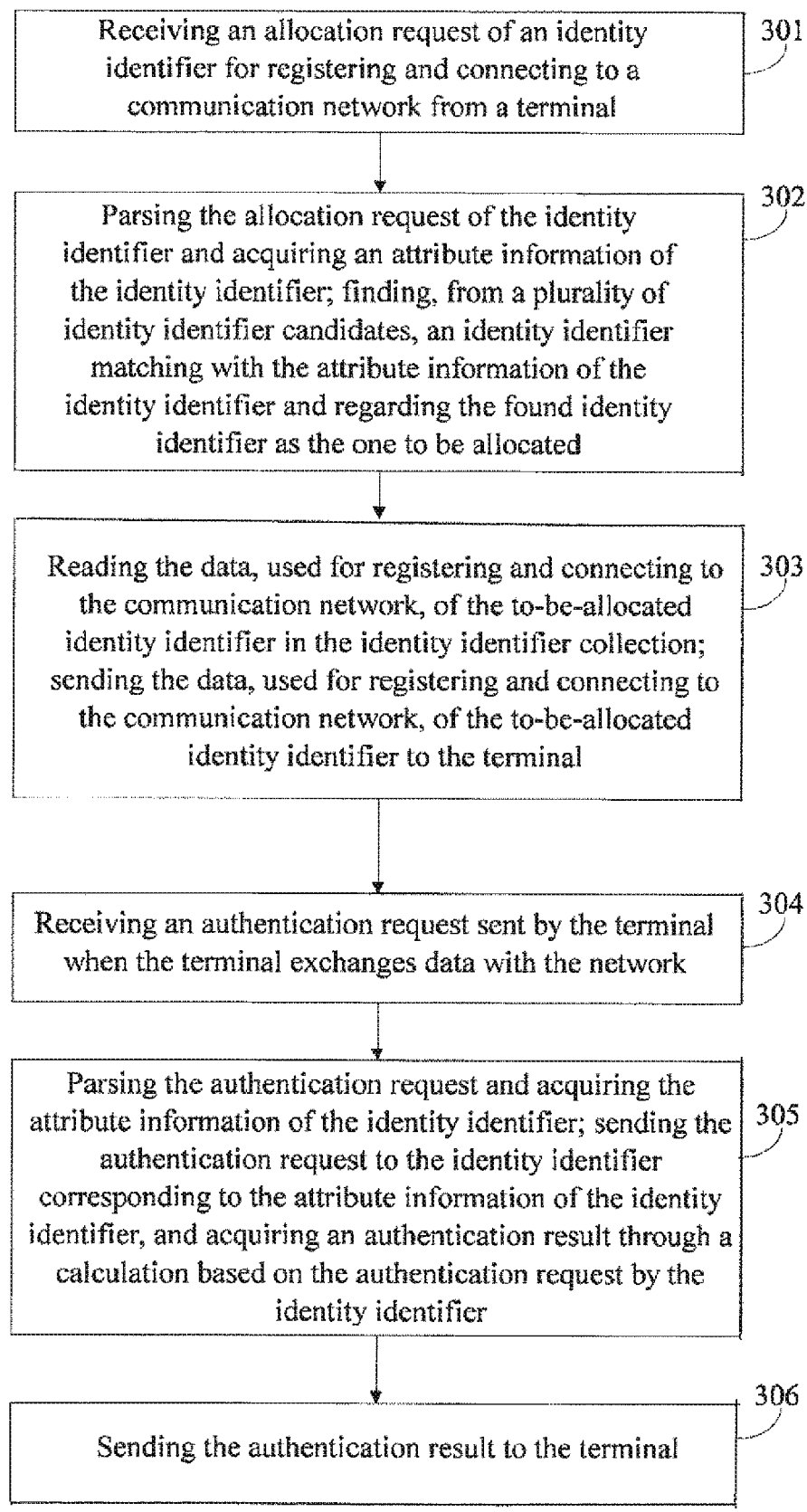
FIG. 3 is a flow diagram of a communication method according to embodiment 3 of the present invention.

FIG. 3 is a flow diagram of a communication method according to embodiment 3 of the present invention; the communication method, in the present example, applies to the server side; the communication method comprises the following steps, as shown in FIG. 3.

Step 301: receiving an allocation request of an identity identifier for registering and connecting to a communication network from a terminal.

In the embodiments of the present invention, the identity identifier is the only identifier for the terminal connecting to the communication network; the embodiments of the present invention are illustrated by the example using the identity identifier as the communication card.

In the embodiments of the present invention, the terminal comprises a communication module 1 and a communication module 2, the communication module 1 is implemented by a modem 1, and the communication module 2 is implemented by a modem 2. The terminal is provided with a card slot, a communication card can be inserted in the card slot, and the communication card is called the user identifier module for users according to the embodiments of the present invention. Wherein, the communication card is an entity card, the communication card can be any type, such as a SIM card, UIM card, etc. The terminal can be provided with two or more card slots, with two or more built-in communication cards respectively.

In the embodiments of the present invention, the first identity identifier is a user identifier module having a data roaming function. The embodiments of the present invention are illustrated by the example using the user identifier module as the SIM card, wherein having a data roaming function means the terminal can implement the data communication for roaming areas directly via the first identity identifier when the terminal is in the roaming areas; however, it requires the use of Ki information for encryption and decryption of data during data communication, and the home service provider for the first identity identifier needs to sign an agreement with the roaming service provider; and roaming charges are higher. For this purpose, the embodiments of the present invention process the data roaming service by using the virtual second identity identifier instead of the first identity identifier. Certainly, the first identity identifier can further process the normal data communication when the second identity identifier processes the data roaming service. To process the data roaming service by using the second identity identifier, the data (also called card information of the second identity identifier) for registering and connecting to the communication network of the second identity identifier needs to be obtained; therefore, the terminal sends the allocation request of the identity identifier to the server to obtain the data for registering and connecting to the communication network of the second identity identifier. Specifically, the first data connection for the first identity identifier should be established on the communication module 2; and the first data connection is to be called Data 1 according to the embodiments of the present invention.

Specifically, the first identity identifier stores key information of the first identity identifier, such as phone numbers, text messages, SIM card password, SIM card number, Ki information, etc. The first identity identifier establishes the Data 1 by using this key information after connecting to the communication module 2.

Thus, the communication module in the server receives the allocation request of the identity identifier from the terminal via the established Data 1. Specifically, the server receives the allocation request of the identity identifier sent by the communication module 2 in the terminal.

Step 302: parsing the allocation request of the identity identifier and acquiring attribute information of the identity identifier; finding, from a plurality of identity identifiers in the identity identifier collection, an identity identifier matching with the attribute information of the identity identifier and regarding the found identity identifier as the one to be allocated.

Wherein, the allocation request of the identity identifier carries a wealth of information of the terminal, such as the device identification information of the terminal, network information belonging to the service providers of the terminal (location information), the network type information of the terminal, etc.

For example, network information for the service providers can be Mobile or Telecom or Unicom. Network type information of the terminal can be GSM network, CDMA network, WCDMA network, LTE communication network, etc.

In the embodiments of the present invention, the server is provided with a collection of identity identifiers (a card pool); the collection of identity identifiers is provided with more than one component, and the components support the insertion of a plurality of identity identifiers; each component in the collection of identity identifiers and the identity identifier on each component is addressed in accordance with the default rule. To manage conveniently, inserting the identity identifier for the network information of the same service provider in the adjacent position, and setting up the corresponding address for these identity identifiers. Or, inserting the identity identifier for the same network type information in the adjacent position, and setting up the corresponding address for these identity identifiers. Afterwards, the arbitration module in the server finds, from a plurality of identity identifiers in the identity identifier collection, an identity identifier corresponding to the allocation request of the identity identifier and regards the found identity identifier as the to-be-allocated identity identifier based on the network information for the service providers of the terminal and the network type information of the terminal.

Step 303: reading the data, used for registering and connecting to the communication network, of the to-be-allocated identity identifier in the identity identifier collection; sending the data, used for registering and connecting to the communication network, of the to-be-allocated identity identifier to the terminal.

In the embodiments of the present invention, the collection of identity identifiers for the server stores a plurality of data for each country and each region used to register and connect to the communication network, and the information comprises other key information, except for Ki information. The terminal sends the allocation request of the identity identifier for the second identity identifier to the communication module by using the Data 1 after establishing the Data 1; the arbitration module finds the data of the second identity identifier for registering and connecting to the communication network of the country and region that the terminal is in. Afterwards, the communication module sends the data of the second identity identifier for registering and connecting to the communication network to the terminal. Because the second identity identifier is established based on the data for registering and connecting to the communication network of the server side, and is not a physical entity card, therefore, the second identity identifier is a virtual user identifier module.

In the embodiments of the present invention, the actual need of the data when establishing the data connection is the data for registering and connecting to the communication network; the first identity identifier, in the form of an entity card, uses the data for registering and connecting to the communication network to establish the Data 1 on the communication module 2; and the second identity identifier, in the form of a virtual card, uses the data for registering and connecting to the communication network to establish the second data connection on the communication module 1; the second data connection is called Data 2 according to the embodiments of the present invention.

In the embodiments of the present invention, when the established Data 2 is in the data roaming service, the Ki information is not used, because the virtual second identity identifier is used, and service providers of the first identity identifier do not need to sign an agreement with the service providers of each country and each region. It is thus clear that the supported countries and regions of the technical solutions in the embodiments of the present invention are unrestricted, and the expenses of the data roaming service can be localized, saving user's capital expenditures.

Step 304: receiving an authentication request sent by the terminal when the terminal exchanges data with the network.

In the embodiments of the present invention, when the terminal based on the communication module 1 interacts data with the network by using the Data 2, the data roaming service can be processed after authenticating to the electronic devices successfully. Interaction between the terminal and the server can only be between the communication module 2 and the server. The identity identifier collection in the server stores a plurality of data for registering and connecting to the communication network corresponding to the identity identifiers, therefore, the authentication is processed by the server. In this respect, the authentication request received by the communication module 1 from the network side needs to be sent to the communication module 2. Afterwards, sending the authentication request to the communication module in the server via the communication module 2.

Based on this, the communication module in the server receives the authentication request sent by the communication module 2 in the terminal, wherein the authentication request is the communication module 1 in the terminal sent by the network, and then the communication module 1 in the terminal sends the authentication request to the communication module 2.

In the embodiments of the present invention, the communication module sends the allocation request of the identity identifier to the main control center after receiving an authentication request sent by the terminal.

Step 305: parsing the authentication request and acquiring the attribute information of the identity identifier; sending the authentication request to the identity identifier corresponding to the attribute information of the identity identifier, and acquiring an authentication result through a calculation based on the authentication request by the identity identifier.

Specifically, the main control center controls the identity identifier control module and sends the authentication request to the identity identifier corresponding to the allocation request of the identity identifier, and acquires an authentication result through a calculation based on the authentication request by the identity identifier.

In the embodiments of the present invention, the authentication request is provided with the identification information of the identity identifier to be allocated, the identification information is used to identify the identity identifier, and the corresponding identity identifier can be found in accordance with the identification information.

Wherein, the identity identifier in the collection of the identity identifiers is provided with the calculative ability of authentication, the calculative ability of authentication is implemented by a specific authentication algorithm, and the identity identifiers of different communication systems are provided with different authentication algorithms Generally, data within the communication card is mainly divided into four classes: index data, business data, authentication data and location data. The authentication data comprises IMSI (International Mobile Subscriber Identification Number), authentication key (Ki (2G) Key (3G)), A3/A5/A8 authentication algorithm, etc.

Step 306: sending the authentication result to the terminal.

In the embodiments of the present invention, the communication module in the server sends the authentication result to the communication module 2 in the terminal, wherein the communication module 2 in the terminal sends the authentication result to the communication module 1, which can ensure the communication module to send the authentication result to the network.

Figure 4:
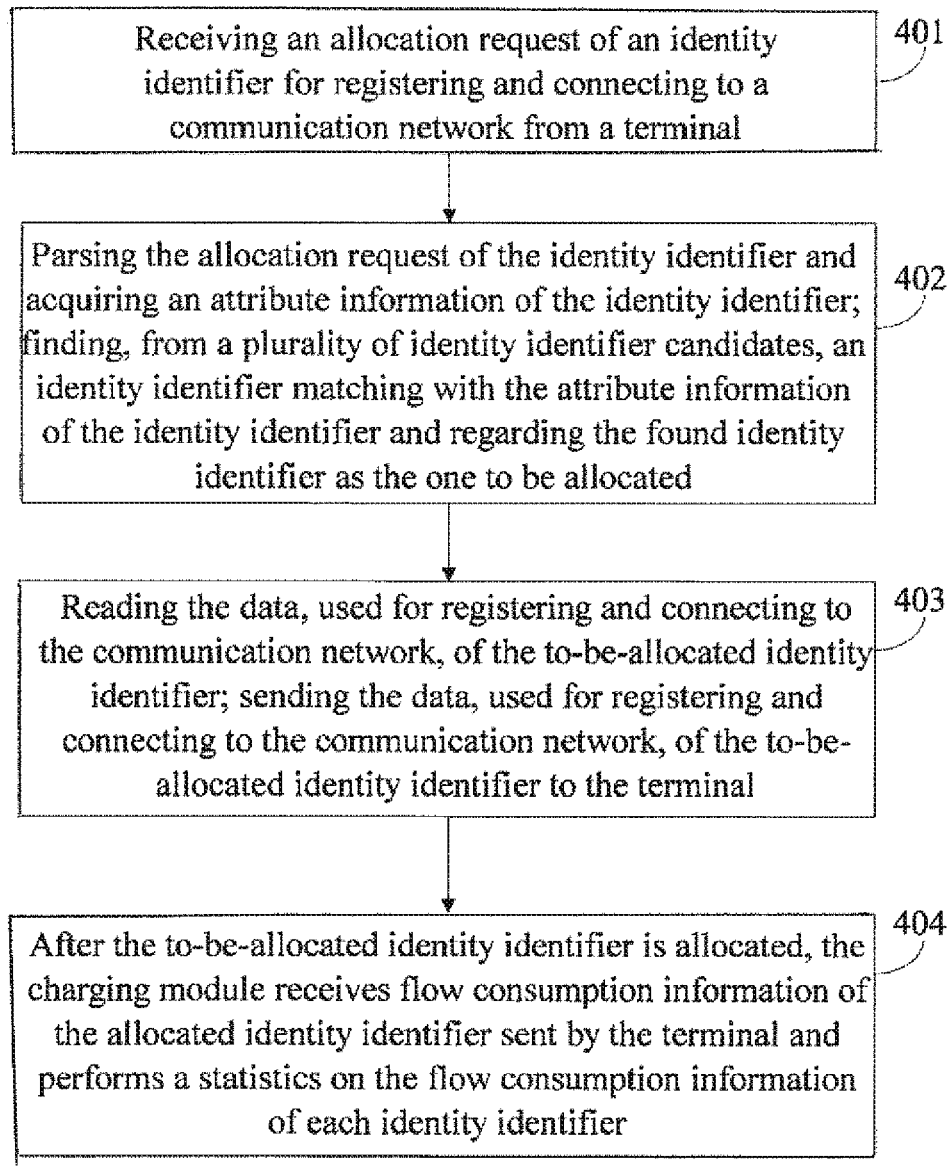
FIG. 4 is a flow diagram of a communication method according to embodiment 4 of the present invention.

FIG. 4 is a flow diagram of a communication method according to embodiment 4 of the present invention; the communication method, in the present example, applies to the server side; the communication method comprises the following steps, as shown in FIG. 4.

Step 401: receiving an allocation request of an identity identifier for registering and connecting to a communication network from a terminal.

In the embodiments of the present invention, the identity identifier is the only identifier for the terminal connecting to the communication network; the embodiments of the present invention are illustrated by the example using the identity identifier as the communication card.

In the embodiments of the present invention, the terminal comprises a communication module 1 and a communication module 2, the communication module 1 is implemented by a modem 1, and the communication module 2 is implemented by a modem 2. The terminal is provided with a card slot, a communication card can be inserted in the card slot, and the communication card is called the user identifier module for users according to the embodiments of the present invention. Wherein, the communication card is an entity card, the communication card can be any type, such as a SIM card, UIM card, etc. The terminal can be provided with two or more card slots, with two or more built-in communication cards respectively.

In the embodiments of the present invention, the first identity identifier is a user identifier module having a data roaming function. The embodiments of the present invention are illustrated by the example using the user identifier module as the SIM card, wherein having a data roaming function means the terminal can implement the data communication for roaming areas directly via the first identity identifier when the terminal is in the roaming areas; however, it requires the use of Ki information for encryption and decryption of data during data communication, and the home service provider for the first identity identifier needs to sign an agreement with the roaming service provider; and roaming charges are higher. For this purpose, the embodiments of the present invention process the data roaming service by using the virtual second identity identifier instead of the first identity identifier. Certainly, the first identity identifier can further process the normal data communication when the second identity identifier processes the data roaming service. To process the data roaming service by using the second identity identifier, the data (also called card information of the second identity identifier) for registering and connecting to the communication network of the second identity identifier needs to be obtained; therefore, the terminal sends the allocation request of the identity identifier to the server to obtain the data for registering and connecting to the communication network of the second identity identifier. Specifically, the first data connection for the first identity identifier should be established on the communication module 2; and the first data connection is to be called Data 1 according to the embodiments of the present invention.

Specifically, the first identity identifier stores key information of the first identity identifier, such as phone numbers, text messages, SIM card password, SIM card number, Ki information, etc. The first identity identifier establishes the Data 1 by using this key information after connecting to the communication module 2.

Thus, the communication module in the server receives the allocation request of the identity identifier from the terminal via the established Data 1. Specifically, the server receives the allocation request of the identity identifier sent by the communication module 2 in the terminal.

Step 402: parsing the allocation request of the identity identifier and acquiring attribute information of the identity identifier; finding, from a plurality of identity identifier candidates, an identity identifier matching with the attribute information of the identity identifier and regarding the found identity identifier as the one to be allocated.

Wherein, the allocation request of the identity identifier carries a wealth of information of the terminal, such as the device identification information of the terminal, network information belonging to the service providers of the terminal (location information), the network type information of the terminal, etc.

For example, network information for the service providers can be Mobile or Telecom or Unicom. Network type information of the terminal can be GSM network, CDMA network, WCDMA network, LTE communication network, etc.

In the embodiments of the present invention, the server is provided with a collection of identity identifiers (a card pool); the collection of identity identifiers is provided with more than one component, and the components support the insertion of a plurality of identity identifiers; each component in the collection of identity identifiers and the identity identifier on each component is addressed in accordance with the default rule. To manage conveniently, inserting the identity identifier for the network information of the same service provider in the adjacent position, and setting up the corresponding address for these identity identifiers. Or, inserting the identity identifier for the same network type information in the adjacent position, and setting up the corresponding address for these identity identifiers. Afterwards, the arbitration module in the server finds, from a plurality of identity identifiers in the identity identifier collection, an identity identifier corresponding to the allocation request of the identity identifier and regards the found identity identifier as the to-be-allocated identity identifier based on the network information for the service providers of the terminal and the network type information of the terminal.

The plurality of identity identifier candidates correspond to different network type information and/or local information. In an implementation of the present invention, determining a local information of the terminal based on the attribute information of the identity identifier; finding, from a plurality of identity identifier candidates, an identity identifier corresponding with the location information of the terminal and regarding the found identity identifier as the one to be allocated, wherein the local information of the to-be-allocated identity identifier is consistent with the location information of the terminal. In another implementation of the present invention, determining a network type information of the terminal based on the attribute information of the identity identifier; finding, from a plurality of identity identifier candidates, an identity identifier corresponding with the location information of the terminal and regarding the found identity identifier as the one to be allocated, wherein the network type information of the to-be-allocated identity identifier is consistent with the network type information of the terminal.

Step 403: reading the data, used for registering and connecting to the communication network, of the to-be-allocated identity identifier; sending the data, used for registering and connecting to the communication network, of the to-be-allocated identity identifier to the terminal.

In the embodiments of the present invention, the collection of identity identifiers for the server stores a plurality of data for each country and each region used to register and connect to the communication network, and the information comprises other key information, except for Ki information. The terminal sends the allocation request of the identity identifier for the second identity identifier to the communication module by using the Data 1 after establishing the Data 1; the arbitration module finds the data of the second identity identifier for registering and connecting to the communication network of the country and region that the terminal is in. Afterwards, the communication module sends the data of the second identity identifier for registering and connecting to the communication network to the terminal. Because the second identity identifier is established based on the data for registering and connecting to the communication network of the server side, and is not a physical entity card, therefore, the second identity identifier is a virtual user identifier module.

In the embodiments of the present invention, the actual need of the data when establishing the data connection is the data for registering and connecting to the communication network; the first identity identifier, in the form of an entity card, uses the data for registering and connecting to the communication network to establish the Data 1 on the communication module 2; and the second identity identifier, in the form of a virtual card, uses the data for registering and connecting to the communication network to establish the second data connection on the communication module 1; the second data connection is called Data 2 according to the embodiments of the present invention.

In the embodiments of the present invention, when the established Data 2 is in the data roaming service, the Ki information is not used, because the virtual second identity identifier is used, and service providers of the first identity identifier do not need to sign an agreement with the service providers of each country and each region. It is thus clear that the supported countries and regions of the technical solutions in the embodiments of the present invention are unrestricted, and the expenses of the data roaming service can be localized, saving user's capital expenditures.

Step 404: after the to-be-allocated identity identifier is allocated, the charging module receives flow consumption information of the allocated identity identifier sent by the terminal and performs statistics on the flow consumption information of each identity identifier.

In the embodiments of the present invention, when the arbitration module inquires the to-be-allocated identity identifier in the identity identifier collection, the method combines the flow consumption information of each identity identifier and finds, from the plurality of identity identifier candidates, an identity identifier matching with the attribute information of the identity identifier and regards the found identity identifier as the one to be allocated. Specifically, in the embodiments of the present invention, the server receives the flow consumption information of each second identity identifier reported by the terminal on time (periodically or some preset time), and then tracks the usage flow for each identity identifier in the collection of identity identifiers; allocation can be in combination with the usage flow for each identity identifier in the collection of identity identifiers when allocating the identity identifier to the terminal; a first strategy, for example, is preferentially allocating the identity identifier with data usage approaching the upper limit of the data plan.

Figure 5:
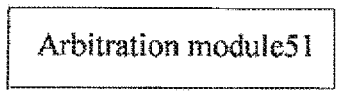
FIG. 5 is a structural composition diagram of a server according to embodiment 1 of the present invention.

FIG. 5 is a structural composition diagram of a server according to embodiment 1 of the present invention, as shown in FIG. 5, the server comprises:

an arbitration module 51, used to, in response to the received allocation request of the identity identifier, parse the allocation request of the identity identifier and acquire an attribute information of the identity identifier; and to find, from a plurality of identity identifiers, an identity identifier matching with the attribute information of the identity identifier and regard the found identity identifier as the one to be allocated.

As those skilled in the art will appreciate, the function realized of each unit in the server shown in FIG. 5 can be appreciated with reference to the related description of the communication method. The function of each unit in the server shown in FIG. 5 can be realized by a program running on the processor, and can be further realized by a specific logical circuit.

Figure 6:
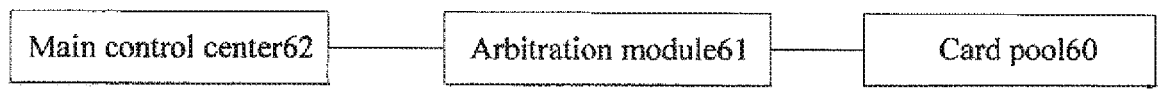
FIG. 6 is a structural composition diagram of a server according to embodiment 2 of the present invention.

FIG. 6 is a structural composition diagram of a server according to embodiment 2 of the present invention; as shown in FIG. 6, the server comprises: a collection of identity identifiers 60 with a plurality of identity identifiers, an arbitration module 61 and a main control center 62;

the arbitration module 61, used to, in response to the received allocation request of the identity identifier, parse the allocation request of the identity identifier and acquire an attribute information of the identity identifier; and to find, from a plurality of identity identifiers, an identity identifier matching with the attribute information of the identity identifier and regard the found identity identifier as the one to be allocated;

the main control center 62, used to send the allocation request of the identity identifier to the arbitration module 61 after receiving an allocation request of the identity identifier;

the arbitration module 61, is further used to find, from the plurality of identity identifiers in the identity identifier collection 60, an identity identifier matching with the attribute information of the identity identifier, and regard the found identity identifier as the one to be allocated, and to send an address information of the to-be-allocated identity identifier to the main control center 62.

As those skilled in the art will appreciate, the function realized of each unit in the server shown in FIG. 6 can be appreciated with reference to the related description of the communication method. The function of each unit in the server shown in FIG. 6 can be realized by the program running on the processor, and can be further realized by the specific logical circuit.

Figure 7:
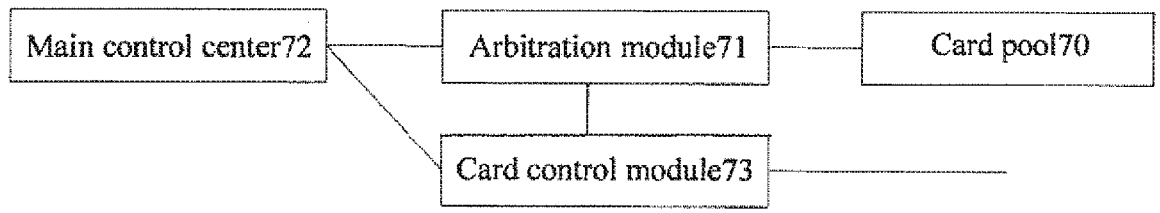
FIG. 7 is a structural composition diagram of a server according to embodiment 3 of the present invention.

FIG. 7 is a structural composition diagram of a server according to embodiment 3 of the present invention; as shown in FIG. 7, the server comprises: a collection of identity identifiers 70 with a plurality of identity identifiers, an arbitration module 71, a main control center 72 and an identity identifier control module 73;

the arbitration module 71, used to, in response to the received allocation request of the identity identifier, parse the allocation request of the identity identifier and acquire an attribute information of the identity identifier; and to find, from a plurality of identity identifiers, an identity identifier matching with the attribute information of the identity identifier and regard the found identity identifier as the one to be allocated;

the main control center 72, used to send the allocation request of the identity identifier to the arbitration module 71 after receiving an allocation request of the identity identifier;

the arbitration module 71, is further used to find, from the plurality of identity identifiers in the identity identifier collection 70, an identity identifier matching with the attribute information of the identity identifier, and regard the found identity identifier as the one to be allocated, and to send an address information of the to-be-allocated identity identifier to the main control center 72.

The main control center 72, is further used to control the identity identifier control module 73 to read the data, used for registering and connecting to the communication network, of the to-be-allocated identity identifier in the identity identifier collection 70 based on the address information of the to-be-allocated identity identifier;

the identity identifier control module 73 is used to read the data, used for registering and connecting to the communication network, of the to-be-allocated identity identifier in the identity identifier collection.

As those skilled in the art will appreciate, the function realized of each unit in the server shown in FIG. 7 can be appreciated with reference to the related description of the communication method. The function of each unit in the server shown in FIG. 7 can be realized by the program running on the processor, and can be further realized by the specific logical circuit.

Figure 8:
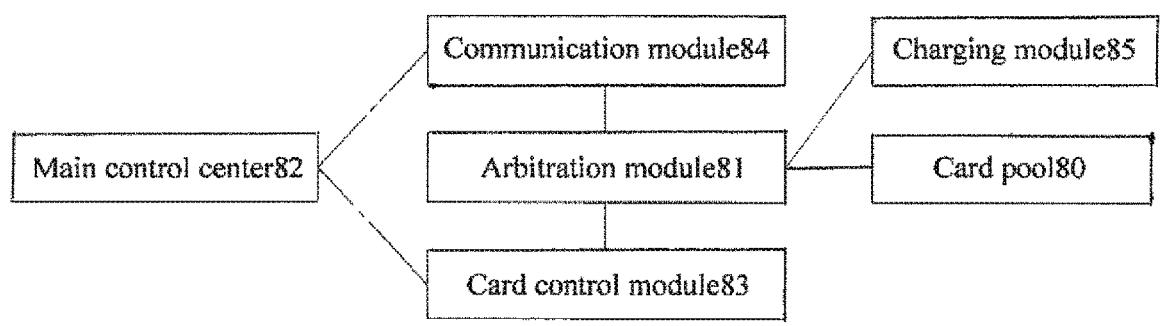
FIG. 8 is a structural composition diagram of a server according to embodiment 4 of the present invention.

FIG. 8 is a structural composition diagram of a server according to embodiment 4 of the present invention; as shown in FIG. 8, the server comprises: a collection of identity identifiers 80 with a plurality of identity identifiers, an arbitration module 81, a main control center 82, a control module for the identity identifier 83 and a communication module 84;

the arbitration module 81, used to, in response to the received allocation request of the identity identifier, parse the allocation request of the identity identifier and acquire an attribute information of the identity identifier; and to find, from a plurality of identity identifiers, an identity identifier matching with the attribute information of the identity identifier and regard the found identity identifier as the one to be allocated;

the main control center 82, used to send the allocation request of the identity identifier to the arbitration module 81 after receiving an allocation request of the identity identifier;

the arbitration module 81, is further used to find, from the plurality of identity identifiers in the identity identifier collection 80, an identity identifier matching with the attribute information of the identity identifier, and regard the found identity identifier as the one to be allocated, and to send an address information of the to-be-allocated identity identifier to the main control center 82.

The main control center 82, is further used to control the identity identifier control module 73 to read the data, used for registering and connecting to the communication network, of the to-be-allocated identity identifier in the identity identifier collection 80 based on the address information of the to-be-allocated identity identifier;

the identity identifier control module 83 is used to read the data, used for registering and connecting to the communication network, of the to-be-allocated identity identifier in the identity identifier collection.

the communication module 84 is used to receive the allocation request of the identity identifier sent by the terminal; send the allocation request of the identity identifier to the main control center 82; and the communication module is further used to send the data, used for registering and connecting to the communication network, of the to-be-allocated identity identifier to the terminal based on the control of the main control center 82.

The communication module 84 is further used to receive an authentication request sent by the terminal;

the identity identifier control module 83 is further used to parse the authentication request and acquire the attribute information of the identity identifier; send the authentication request to the identity identifier corresponding to the attribute information of the identity identifier, and acquire an authentication result through a calculation based on the authentication request by the identity identifier;

the communication module 84 is further used to send the authentication result to the terminal.

The communication module 84, is further used to send the authentication request to the main control center 82 after receiving an authentication request sent by the terminal;

The main control center 82 is further used to control the identity identifier control module 83 to parse the authentication request and acquire the attribute information of the identity identifier; send the authentication request to the identity identifier corresponding to the attribute information of the identity identifier and acquire an authentication result through a calculation based on the authentication request by the identity identifier; and to control the communication module 84 to send the authentication result to the terminal.

The server further comprises:

a charging module 85, used to receive flow consumption information of the allocated identity identifiers sent by the terminal; and to perform a statistics on the flow consumption information of each identity identifier.

the arbitration module 81 is further used to combine the flow consumption information of each identity identifier and to find, from a plurality of identity identifiers, an identity identifier matching with the attribute information of the identity identifier and regarding the found identity identifier as the one to be allocated.

The attribute information of the identity identifier comprises one or more of the following information: device identification information of the terminal, or local information of the terminal, or network type information of the terminal.

The plurality of identity identifiers correspond to different network type information and/or local information.

The arbitration module 81 is further used to determine a location information of the terminal based on the attribute information of the identity identifier; find, from a plurality of identity identifiers, an identity identifier corresponding with the location information of the terminal and regarding the found identity identifier as the one to be allocated, wherein the local information of the to-be-allocated identity identifier is consistent with the location information of the terminal.

The arbitration module 81 is further used to determine the network type information of the terminal based on the attribute information of the identity identifier; find, from a plurality of identity identifiers, an identity identifier corresponding with the network type information of the terminal, and regard the found identity identifier as the one to be allocated, wherein the network type information of the to-be-allocated identity identifier is consistent with the network type information of the terminal.

As those skilled in the art will appreciate, the function realized of each unit in the server shown in FIG. 8 can be appreciated with reference to the related description of the communication method. The function of each unit in the server shown in FIG. 8 can be realized by the program running on the processor, and can be further realized by the specific logical circuit.

Figure 9:
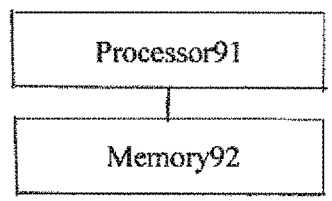
FIG. 9 is a structural composition diagram of a server according to embodiment 5 of the present invention.

FIG. 9 is a structural composition diagram of a server according to embodiment 5 of the present invention, as shown in FIG. 9, the server comprises: a processor, used to receive an allocation request of an identity identifier sent by a terminal; parse the allocation request of the identity identifier and acquire an attribute information of the identity identifier; find, from a plurality of identity identifier candidates, an identity identifier matching with the attribute information of the identity identifier and regard the found identity identifier as the one to be allocated; read the data, used for registering and connecting to the communication network, of the to-be-allocated identity identifier and send the data, used for registering and connecting to the communication network, of the to-be-allocated identity identifier to the terminal.

The processor 91 is further used to receive an authentication request sent by the terminal; parse the authentication request and acquire an attribute information of the identity identifier; send the authentication request to the identity identifier corresponding to the attribute information of the identity identifier, and acquire an authentication result through a calculation based on the authentication request by the identity identifier; and send the authentication result to the terminal.

The processor 91 is further used to parse the allocation request of the identity identifier and acquire one or more of the following information: the device identification information of the terminal, or the local information of the terminal, or the network type information of the terminal.

The plurality of identity identifier candidates correspond to different network type information and/or local information.

The server further comprises: a memory 92, used to store multiple identity identifier candidates.

The processor 91 is further used to determine a location information of the terminal based on the attribute information of the identity identifier; find, from a plurality of identity identifier candidates, an identity identifier corresponding with the location information of the terminal and regarding the found identity identifier as the one to be allocated, wherein the local information of the to-be-allocated identity identifier is consistent with the location information of the terminal.

The processor 91 is further used to determine the network type information of the terminal based on the attribute information of the identity identifier; find, from the plurality of identity identifier candidates, an identity identifier corresponding with the network type information of the terminal, and regard the found identity identifier as the one to be allocated, wherein the network type information of the to-be-allocated identity identifier is consistent with the network type information of the terminal.

Figure 10:
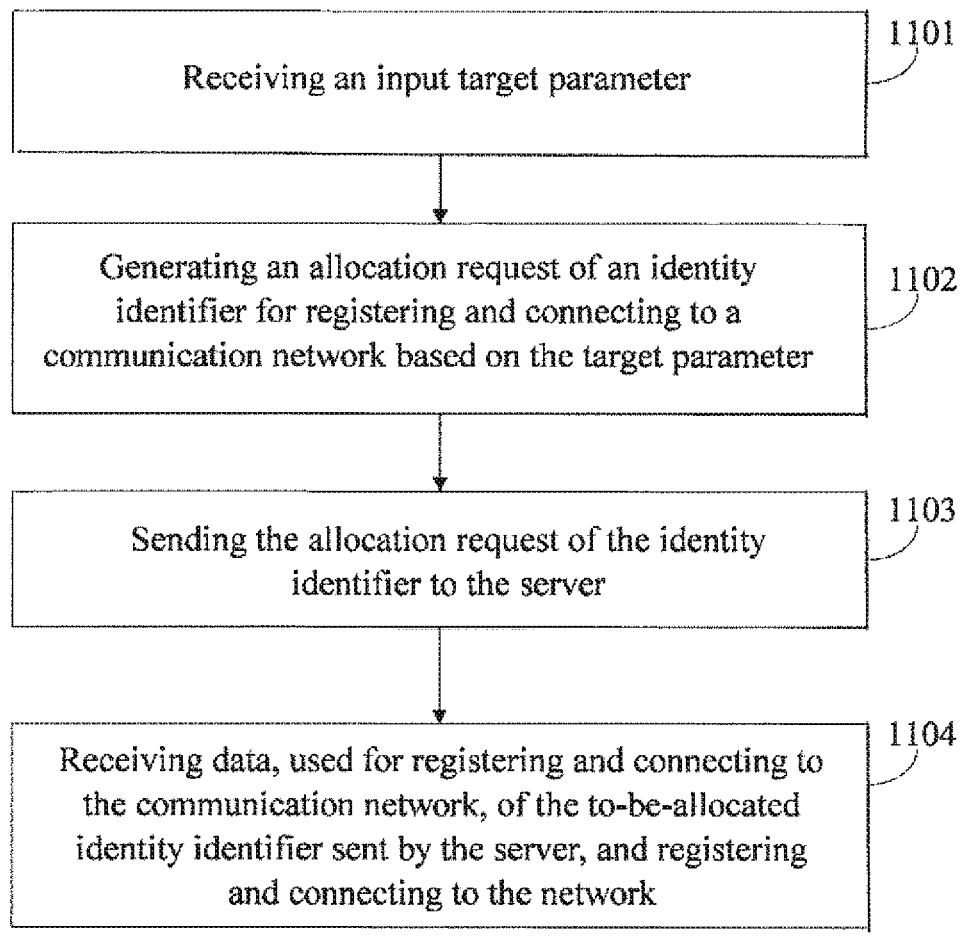
FIG. 10 is a flow diagram of a communication method according to embodiment 5 of the present invention.

FIG. 10 is a flow diagram of a communication method according to embodiment 5 of the present invention; the communication method comprises the following steps, as shown in FIG. 10.

Step 1101: receiving an input target parameter.

In the embodiments of the present invention, the terminal (such as a keyboard and a touch display screen) receives the target parameter input by the user via the input device, the target parameter is used to represent the roaming destination, for example, the roaming destination for the terminal is America.

Step 1102: generating an allocation request of an identity identifier for registering and connecting to a communication network based on the target parameter.

In an implementation of the present invention, the terminal acquires device identification information of the terminal, and/or network type information of the terminal. Afterwards, generates an allocation request of the identity identifier based on the device identification information of the terminal, and/or the roaming destination information, and/or the network type information of the terminal. Here, the allocation request of the identity identifier is provided with the device identification information of the terminal, and/or the network type information of the terminal, and/or the roaming destination information.

In another implementation of the present invention, the terminal acquires the device identification information of the terminal, and/or the network type information of the terminal; and the terminal determines the to-be-allocated identity identifier based on the device identification information of the terminal, and/or the roaming destination information and/or the network type information of the terminal; generates the allocation request of the identity identifier based on the to-be-allocated identity identifier. Here, the allocation request of the identity identifier is provided with the identity identifier to be allocated.

Step 1103: sending the allocation request of the identity identifier to the server.

The allocation request of the identity identifier is used for enabling the server to parse the request and acquiring an attribute information of the identity identifier, and determining the to-be-allocated identity identifier based on an attribute information of the identity identifier Specifically, the server receives the allocation request, used for registering and connecting to the communication network, of the identity identifier from the terminal; parses the allocation request of the identity identifier and acquire an attribute information of the identity identifier; finds, from a plurality of identity identifier candidates, an identity identifier matching with the attribute information of the identity identifier and regards the found identity identifier as the one to be allocated; reads the data, used for registering and connecting to the communication network, of the to-be-allocated identity identifier and sends the data, used for registering and connecting to the communication network, of the to-be-allocated identity identifier to the terminal.

Step 1104: receiving data, used for registering and connecting to the communication network, of the to-be-allocated identity identifier sent by the server, and registering and connecting to the network.

Figure 11:
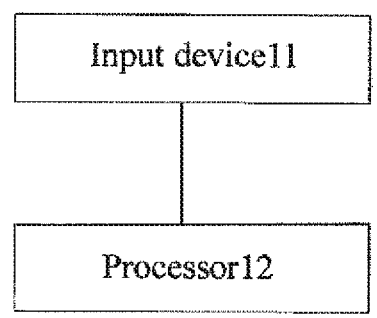
FIG. 11 is a structural composition diagram of a terminal according to an embodiment of the present invention.

FIG. 11 is a structural composition diagram of a terminal according to embodiments of the present invention, as shown in FIG. 11, the terminal comprises:

an input device 11, used to receive an input target parameter;

a processor 12, used to generate an allocation request, used for registering and connecting to the communication network, of an identity identifier based on the target parameter; send the allocation request of the identity identifier to the server, the allocation request of the identity identifier is used for enabling the server to parse the request and acquiring an attribute information of the identity identifier, and determining the to-be-allocated identity identifier based on an attribute information of the identity identifier; receive the data, used for registering and connecting to the communication network, of the to-be-allocated identity identifier sent by the server, and to register and connect to the network.

The target parameter comprises at least: roaming destination information.

The processor 12 is further used to acquire device identification information of the terminal, and/or network type information of the terminal; generate the allocation request of the identity identifier based on the device identification information of the terminal, and/or the roaming destination information and/or the network type information of the terminal.

The processor 12 is further used to acquire the device identification information of the terminal, and/or the network type information of the terminal; determine the to-be-allocated identity identifier based on the device identification information of the terminal, and/or the roaming destination information and/or the network type information of the terminal; generate the allocation request of the identity identifier based on the to-be-allocated identity identifier.

The technical solution recorded by the embodiments of the present invention can be combined arbitrarily without conflict.

It should be understood that the methods and the smart devices disclosed in the embodiments of the present application may be implemented in other ways. The device embodiments as described above are only for illustration, for example, the unit division is only a logical function division, and may be partially implemented in other manners. For example, a plurality of units or components can be combined, or can be integrated into another system; some features may be omitted, or not be executed. Additionally, coupling, direct coupling, or communication connections among the component parts as shown or discussed may be implemented through some interface(s), and indirect coupling or communication connections of devices or units may be in an electrical, mechanical, or other form.

The units described above as separate components may or may not be separated physically. The components illustrated as units may or may not be physical units, which can be located in one place, and also can be allocated to a plurality of network units; the object of the present solution of the embodiments can be achieved by some or all of the units, according to actual requirements.

Additionally, each function unit in the embodiments of the present invention can be integrated in a second processing unit, or each unit work separately as one unit, or two or more units integrated into one unit; the integrated unit can come in the form of hardware or in the form of a hardware plus software functional unit.

The above are only some particular implementations of the present disclosure, and the protection scope of the present disclosure is not limited thereto. Variations or alterations that are within the technical scope as disclosed in the present disclosure and may be readily conceived by those skilled in the art fall within the protection scope of the present disclosure.

What is claimed is:

1. A computer-implemented method, comprising executing on a computer processor the steps of:
   in response to receiving from a mobile terminal an allocation request that comprises an identity identifier for use within a communication network, parsing the allocation request and thereby acquiring attribute information of the identity identifier;
   receiving flow consumption information corresponding to a plurality of identity identifier candidates sent by the mobile terminal, wherein the plurality of identity identifier candidates comprises the identity identifier;
   determining statistics on the flow consumption information of the plurality of identity identifier candidates sent by the mobile terminal;
   finding, from a server storing data corresponding to the plurality of identity identifier candidates, data corresponding to the identity identifier comprised in the allocation request based on the acquired attribute information of the identity identifier as a function of the determined statistics on the flow consumption information of the plurality of identity identifier candidates sent by the mobile terminal;
   reading the data corresponding to the identity identifier; and
   sending the read data to the mobile terminal for use within the communication network.

2. The communication method according to claim 1, further comprising:
   acquiring address information corresponding to the identity identifier comprised in the allocation request; and
   reading the data corresponding to the identity identifier.

3. The communication method according to claim 1, further comprising:
   receiving an authentication request sent by the mobile terminal;
   parsing the authentication request and thereby acquiring the attribute information of the identity identifier; and
   sending the authentication result to the mobile terminal.

4. The communication method according to claim 3, further comprising:
   parsing the allocation request and thereby acquiring at least one of device identification information of the terminal, local information of the terminal, and a network type information of the terminal.

5. The method of claim 4, further comprising:
   receiving an input target parameter;
   generating the allocation request that comprises the identity identifier based on the received target parameter; and
   sending the allocation request that comprises the identity identifier to the server.

6. The method according to claim 5, wherein the target parameter comprises at least roaming destination information.

7. The method according to claim 6, wherein the step of acquiring the at least one of the device identification information of the terminal, the local information of the terminal and the network type information of the terminal comprises generating the allocation request of the identity identifier for registering and connecting to the communication network based on the target parameter and on at least one of the device identification information of the terminal, the roaming destination information, and the network type information of the terminal.

8. A server, comprising:
   a processor that is in communication with a memory and a communication network terminal; and
   a charging module that receives the flow consumption information of a plurality of identity identifiers sent by a mobile terminal;
   wherein the processor is operable to respond to an allocation request received from a mobile terminal, the allocation request comprising an identity identifier of the plurality of identity identifiers sent by a mobile terminal, to parse the allocation request of the identity identifier and thereby acquire an attribute information of the identity identifier, determine statistics on the flow consumption information of plurality of identity identifiers sent by a mobile terminal, and find, from the memory storing data corresponding to the plurality of identity identifiers, data corresponding to the identity identifier comprised in the allocation request based on the attribute information of the identity identifier as a function of the determined statistics on the flow consumption information of the plurality of identity identifier candidates sent by the mobile terminal for use by the mobile terminal within a communication network.

9. The server according to claim 8, further comprising a communication module that is configured to send the data corresponding to the identity identifier comprised in the allocation request.

10. The server according to claim 9, wherein the communication module receives an authentication request sent by the terminal;
   acquires an authentication result through a calculation based on the authentication request by the identity identifier; and
   sends the authentication result to the terminal.

* * * * *